(12) United States Patent
Narita et al.

(10) Patent No.: US 11,724,644 B2
(45) Date of Patent: Aug. 15, 2023

(54) VEHICLE AND VEHICLE CONTROL SYSTEM

(71) Applicant: TOYOTA JIDOSHA KABUSHIKI KAISHA, Toyota (JP)

(72) Inventors: Saki Narita, Toyota (JP); Tetsuya Kanata, Susono (JP); Yozo Iwami, Susono (JP); Daisaku Honda, Nagoya (JP); Yuhei Katsumata, Fuji (JP); Hideki Fukudome, Toyota (JP); Takuya Watabe, Hachioji (JP); Naoko Ichikawa, Tokyo-to (JP); Yuta Maniwa, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 31 days.

(21) Appl. No.: 17/463,983

(22) Filed: Sep. 1, 2021

(65) Prior Publication Data
US 2022/0063597 A1 Mar. 3, 2022

(30) Foreign Application Priority Data

Sep. 3, 2020 (JP) ................................ 2020-148294

(51) Int. Cl.
*B60W 30/02* (2012.01)
*B62D 51/00* (2006.01)
(Continued)

(52) U.S. Cl.
CPC ............... *B60W 30/02* (2013.01); *B60Q 3/76* (2017.02); *B60W 40/13* (2013.01);
(Continued)

(58) Field of Classification Search
CPC ................. B60W 30/02; B60W 40/13; B60W 2540/227; B60W 2720/106;
(Continued)

(56) References Cited

U.S. PATENT DOCUMENTS

| 7,826,948 B2 * | 11/2010 | Messih | B60T 8/17551 |
| | | | 340/440 |
| 2015/0213695 A1 * | 7/2015 | Carlson | G08B 5/00 |
| | | | 340/815.4 |

FOREIGN PATENT DOCUMENTS

| CN | 106185494 | * 12/2016 | ............... B66B 1/08 |
| CN | 208421892 | * 1/2019 | ............. G06Q 30/02 |

(Continued)

OTHER PUBLICATIONS

Yongjie Xiao et al., "Research and Development on Safe Stowing and Securing of Vehicle on Board Ro-ro Passenger Ships," 2010 International Conference on Logistics Engineering and Intelligent Transportation Systems, Nov. 26-18, 2010 (Year: 2010).*

(Continued)

*Primary Examiner* — Joan T Goodbody
(74) *Attorney, Agent, or Firm* — Dinsmore & Shohl LLP

(57) ABSTRACT

A vehicle for transporting passengers include a floor board on which the passengers ride. The vehicle further includes a passenger distribution detection device that detects a passenger distribution that is a distribution of the passengers on the floor board. The vehicle further includes a control device that executes a passenger guidance control that guides the passengers on the floor board such that the passenger distribution approaches a target passenger distribution to increase a stability of the vehicle.

9 Claims, 21 Drawing Sheets

(51) Int. Cl.
  *B62D 51/02* (2006.01)
  *B60Q 3/76* (2017.01)
  *B60W 40/13* (2012.01)
  *B62D 25/20* (2006.01)

(52) U.S. Cl.
  CPC ....... *B62D 25/2009* (2013.01); *B62D 51/001* (2013.01); *B62D 51/02* (2013.01); *B60W 2540/227* (2020.02); *B60W 2720/106* (2013.01); *B60W 2720/125* (2013.01); *B60W 2720/14* (2013.01)

(58) Field of Classification Search
  CPC ........ B60W 2720/125; B60W 2720/14; B60Q 3/76; B62D 25/2009; B62D 51/001; B62D 51/02
  See application file for complete search history.

(56) References Cited

FOREIGN PATENT DOCUMENTS

| | | | | |
|---|---|---|---|---|
| CN | 109598547 | * | 4/2019 | ......... G06Q 30/0281 |
| JP | 2005-053461 A | | 3/2005 | |
| JP | 2017-226370 A | | 12/2017 | |

OTHER PUBLICATIONS

Szxymonski, Hab Eng. Marek, "Some Notes on Risk and Safety Evaluation of Ro-ro Passenger Ships Exploitation," 2019 European Navigation Conference (ENC), Apr. 9-12, 2019. (Year: 2019).*

* cited by examiner

VEHICLE AND VEHICLE CONTROL SYSTEM

CROSS-REFERENCE TO RELATED APPLICATIONS

This application claims priority to Japanese Patent Application No. 2020-148294 filed on Sep. 3, 2020, the entire contents of which are herein incorporated by reference.

TECHNICAL FIELD

The present disclosure relates to a vehicle that transports passengers and a vehicle control system that controls the vehicle. In particular, the present disclosure relates to a vehicle including a floor board on which the passengers ride and a vehicle control system for controlling the vehicle.

BACKGROUND ART

Japanese Patent Application Laid-Open No. 2005-053461 discloses a stand-up type vehicle that travels with a plurality of occupants. The stand-up type vehicle travels on a golf course, for example.

Japanese Patent Application Laid-Open No. 2017-226370 discloses a desk mounted on a vehicle. A top plate of the desk is provided with an image display unit that can be visually recognized by an occupant.

SUMMARY

The present disclosure is directed to a vehicle that transports passengers. In particular, the present disclosure is directed to a vehicle with a floor board on which the passengers ride. When the distribution of the passengers on the floor board is biased, the stability of the vehicle may decrease. The decrease in the stability of the vehicle causes a feeling of uneasiness in the passengers.

An object of some aspects of the present disclosure is to provide a technique configured to suppress a decrease in the stability of the vehicle on which the passengers ride.

A first aspect relates to a vehicle that transports passengers. The vehicle includes a floor board on which the passengers ride, a passenger distribution detection device that detects a passenger distribution and a control device. The passenger distribution is a distribution of the passengers on the floor board. The control device executes a passenger guidance control that guides the passengers on the floor board so that the passenger distribution approaches a target passenger distribution to increase a stability of the vehicle.

A second aspect relates to a vehicle control system for controlling a vehicle including a floor board on which the passengers ride. The vehicle control system includes a passenger distribution detection device that detects a passenger distribution and a control device. The passenger distribution is a distribution of the passengers on a floor board. The control device executes a passenger guidance control that guides the passengers on the floor board so that the passenger distribution approaches a target passenger distribution to increase a stability of the vehicle.

A third aspect relates to a vehicle control system for controlling a vehicle including a floor board on which the passengers ride. The vehicle control system includes a passenger distribution detection device that detects a passenger distribution and a control device. The passenger distribution is a distribution of the passengers on a floor board. The control device executes a travel limit control that limits at least one of a speed, a longitudinal acceleration, a lateral deceleration, and a yaw rate of the vehicle so as to suppress an increase in an inclination of the vehicle, based on the passenger distribution.

Based on at least one of the passenger guidance control and the travel limit control described above, it is possible to suppress a decrease in the stability of the vehicle including the floor board on which the passenger rides. As a result, a sense of uneasiness of the passengers is suppressed.

DETAILED DESCRIPTION

Embodiments of the present disclosure will be described with reference to the accompanying drawings.

1. Outline of Vehicle 1.1. Vehicle Configuration

Figure 1:
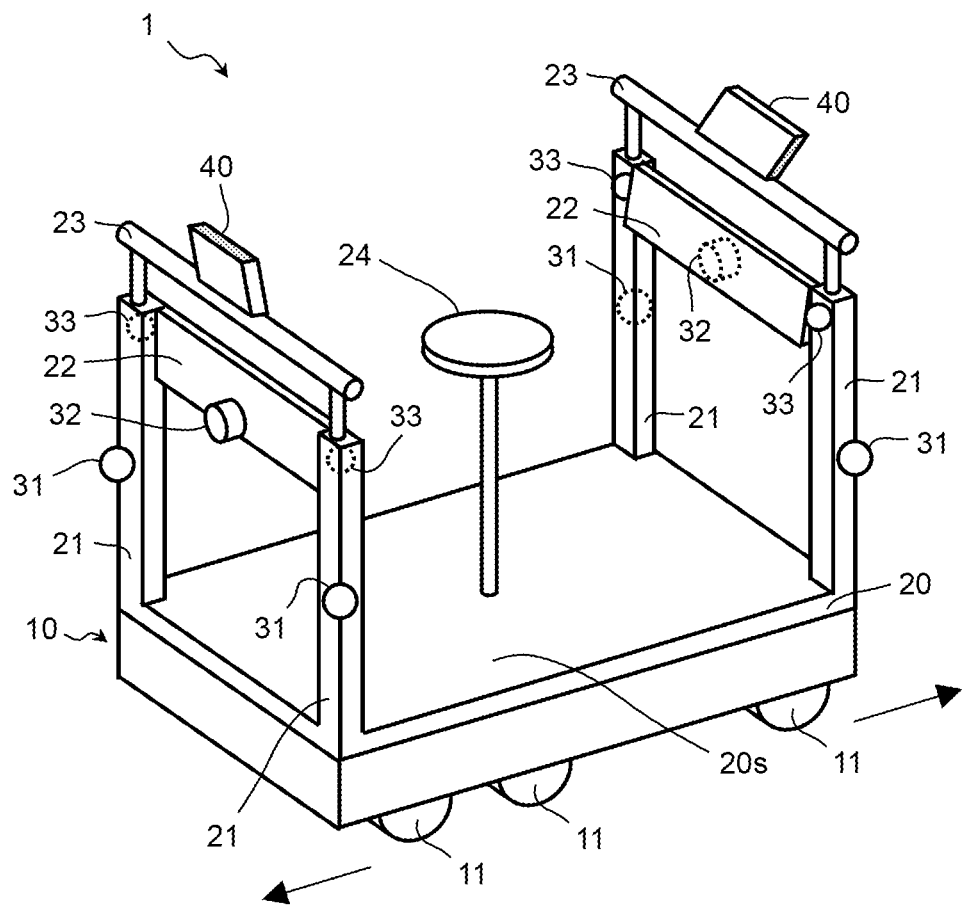
FIG. 1 is a perspective view schematically showing an example configuration of a vehicle according to an embodiment of the present disclosure.
Figure 2:
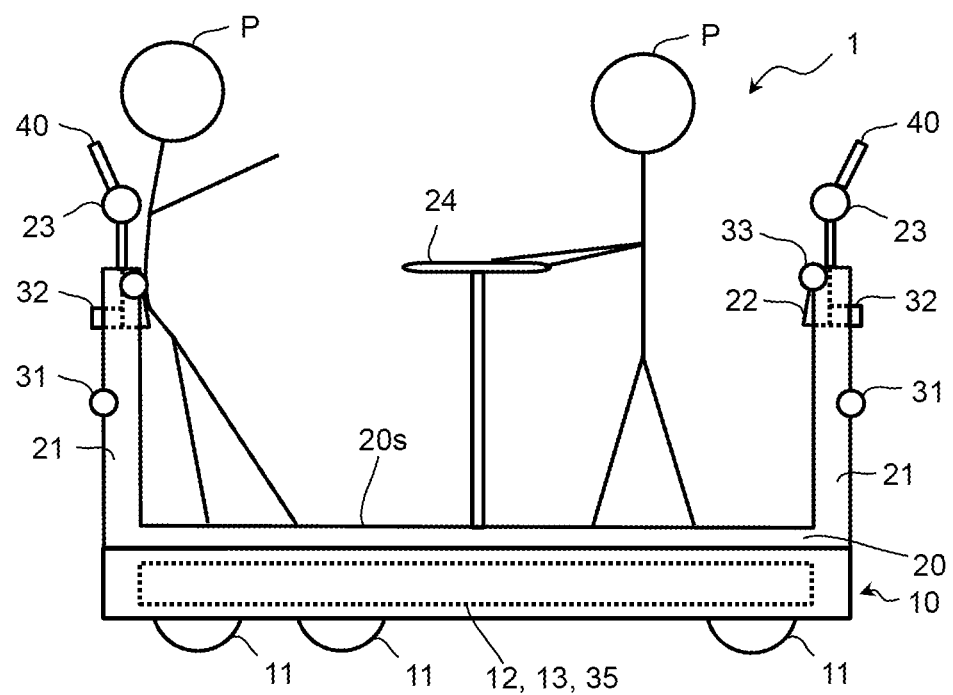
FIG. 2 is a side view schematically showing the example configuration of the vehicle according to the embodiment of the present disclosure.

FIGS. 1 and 2 are a perspective view and a side view, respectively, schematically illustrating an example configuration of a vehicle 1 according to the present embodiment. The vehicle 1 is a small vehicle that transports at least one passenger P thereon. The vehicle 1 may also be referred to as a cart, pallet, or the like. In some embodiments, the vehicle 1 may be configured to travel autonomously. However, the vehicle 1 is not limited to an autonomous vehicle. The vehicle 1 may be remotely operated by a remote operator.

The vehicle 1 includes a carriage 10. The carriage 10 has a plurality of wheels 11 and provides a traveling operation of the vehicle 1.

The vehicle 1 further comprises a floor board 20. The floor board 20 is installed on the carriage 10. The floor board 20 may be separated from the carriage 10 or may be formed integrally with the carriage 10. The upper surface of the floor board 20 is a floor surface 20s. The passenger P rides on the floor board 20 (floor surface 20s). In this sense, the floor surface 20s may be referred to as a riding surface, a deck, or the like. For example, a height of the floor surface 20s is about 30 cm from the ground. Typically, the passenger P stands on the floor board 20 (floor surface 20s). When the passenger P stands on the floor board 20, the vehicle 1 may be referred to as a "stand-up vehicle". However, the passenger P does not necessarily have to be standing, and may be sitting on the floor board 20. In any case, a space above the floor board 20 (floor surface 20s) is a riding space for the passenger P.

The configuration of the riding space is arbitrary. In the example shown in FIGS. 1 and 2, supports 21 are erected at the four corners of the floor board 20. The support 21 may be separated from the floor board 20 or may be formed integrally with the floor board 20. A backrest 22 is provided between the left and right supports 21. A standing passenger P can lean against the backrest 22. A handrail 23 is provided above the support 21 and the backrest 22. The passenger P can grasp the handrail 23. A table 24 may be installed in the center of the floor surface 20s.

The vehicle 1 further includes at least one outer camera 31 that images a situation around the vehicle 1. In the illustrated embodiment, four outer cameras 31 are attached to the four supports 21 to capture images of the right front side, the left front side, the right rear side, and the left rear side of the vehicle 1, respectively. The vehicle 1 may further include at least one LIDAR (Light Detection And Ranging) 32 that detects an object around the vehicle 1. In the illustrated embodiment, two LIDARs 32 are attached to the front surface and the rear surface of the vehicle 1, respectively, to detect objects in front of and behind the vehicle 1. The vehicle 1 may further include at least one inner camera 33 that captures an image of above the floor board 20. In the illustrated embodiment, four inner cameras 33 are attached to the four supports 21.

The vehicle 1 may further include a human-machine interface (HMI) unit 40. The HMI unit 40 provides information to the passenger P and receives information from the passenger P. The HMI unit 40 is, for example, a tablet, a touch panel, or the like.

Figure 3:
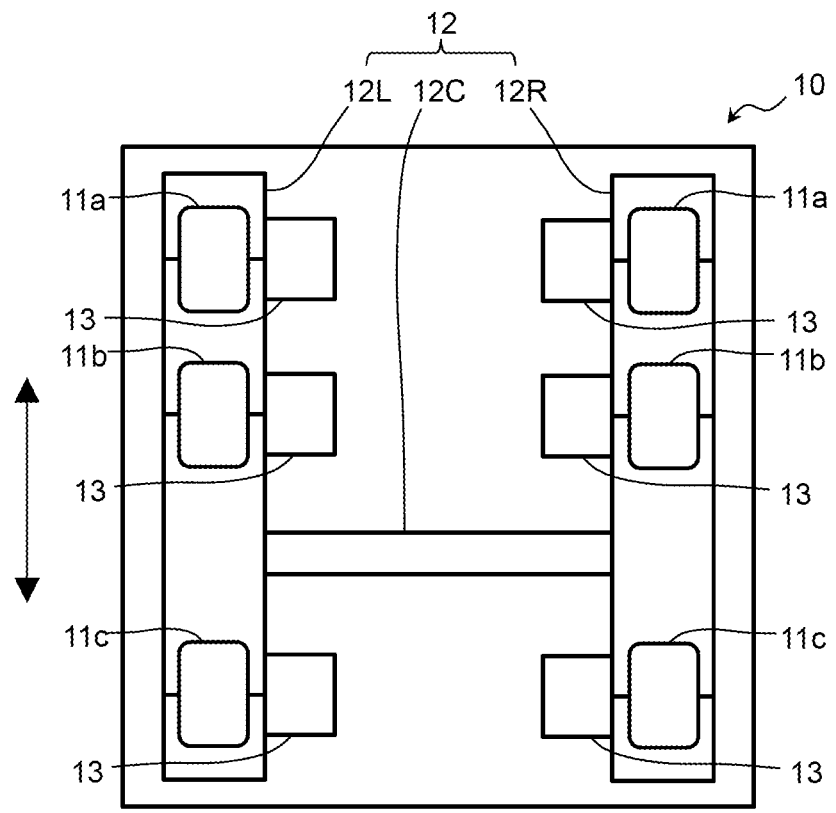
FIG. 3 is a plan view schematically showing the example configuration of a bottom of a carriage of the vehicle according to the embodiment of the present disclosure.

FIG. 3 is a plan view schematically illustrating a configuration example of the carriage 10. The carriage 10 includes a plurality of wheels 11, a frame 12, and a plurality of motors 13. The frame 12 includes a left frame 12L, a connection frame 12C, and a right frame 12R.

For example, the plurality of wheels 11 include front wheels 11a, middle wheels 11b, and rear wheels 11c. The front wheels 11a, the middle wheels 11b, and the rear wheels 11c are provided on the left and right of the vehicle 1. The left front wheel 11a, the left middle wheel 11b, and the left rear wheel 11c are attached to the left frame 12L. The right front wheel 11a, the right middle wheel 11b, and the right rear wheel 11c are attached to the right frame 12R. The connection frame 12C connects the left frame 12L and the right frame 12R. When discussed collectively, the front wheels 11a, the middle wheels 11b, and the rear wheels 11c may be referred to as the plurality of wheels 11.

The plurality of wheels 11 are independently driven by the plurality of motors 13, respectively. Thus, the plurality of wheels 11 can rotate at speeds and in directions independent of each other. The plurality of motors 13 is supplied with electric power from a battery (not shown). Examples of the battery include a lithium ion battery.

Acceleration and deceleration of the vehicle 1 are performed by controlling the plurality of motors 13. Braking of the vehicle 1 may be performed using regenerative braking by control of the plurality of motors 13. In some embodiments, at least one of the plurality of wheels 11 may be provided with a mechanical brake.

Turning of the vehicle 1 can be realized by controlling a difference in rotation speed between the left and right wheels 11 by controlling the plurality of motors 13. The front wheels 11a and the rear wheels 11c may be omni-wheels, and the middle wheels 11b may be normal wheels. As a modification, the carriage 10 may include a steering mechanism that steers the wheels 11.

1-2. Vehicle Control System

Figure 4:
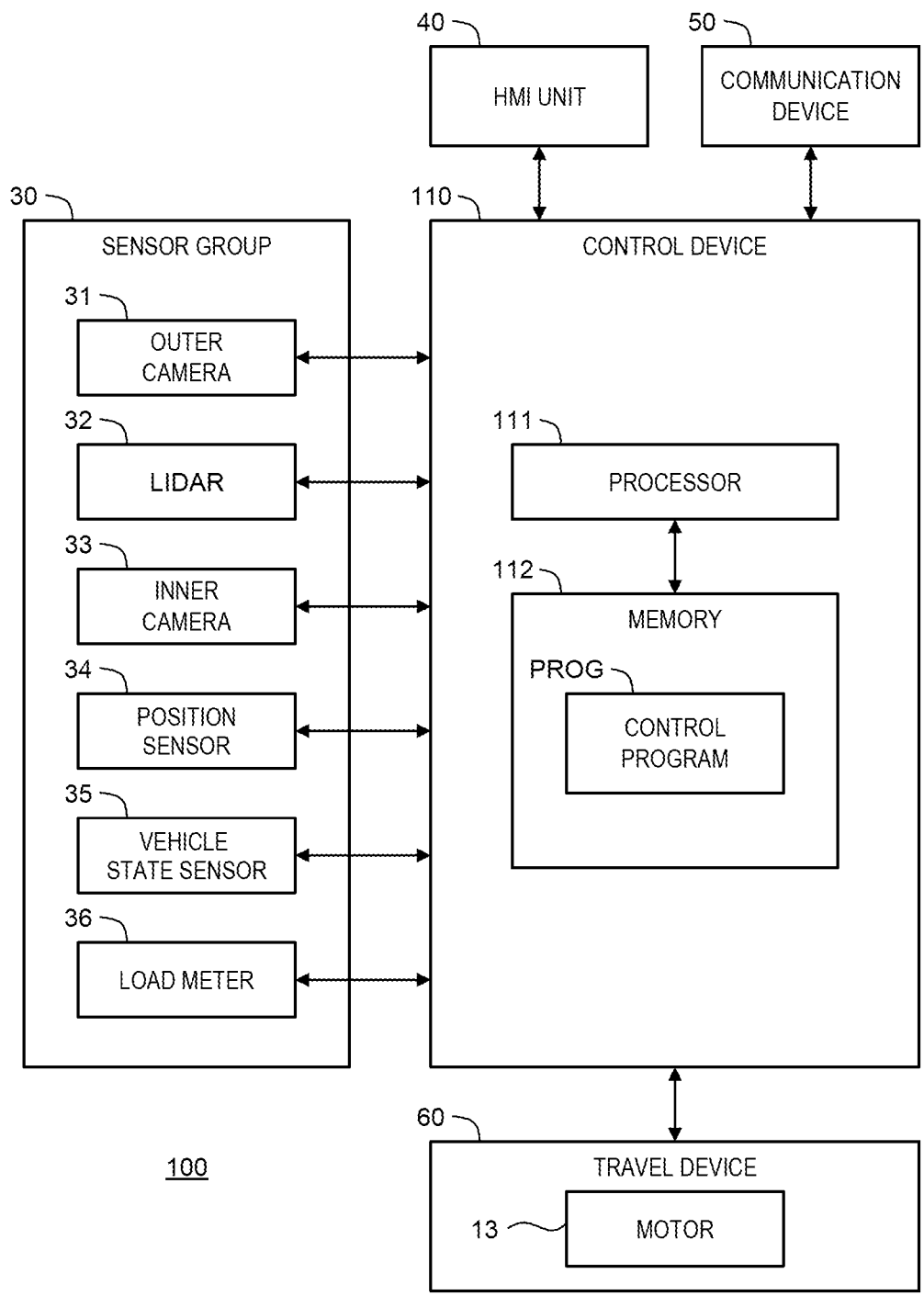
FIG. 4 is a block diagram showing an example configuration of a vehicle control system according to an embodiment of the present disclosure.

FIG. 4 is a block diagram illustrating an example configuration of a vehicle control system 100 that controls the vehicle 1 according to the present embodiment. The vehicle control system 100 includes a sensor group 30, an HMI unit 40, a communication device 50, a travel device 60, and a control device 110.

The sensor group 30 includes recognition sensors such as the outer camera 31, the LIDAR 32, and the inner camera 33 described above.

The sensor group 30 includes a position sensor 34 that acquires the position and the direction of the vehicle 1. In some embodiments, the position sensor 34 is a global navigation satellite system (GNSS) receiver.

Further, the sensor group 30 includes a vehicle state sensor 35 that detects a state of the vehicle 1. The state of the vehicle 1 includes, for example, vehicle speed, acceleration (longitudinal acceleration, lateral acceleration, vertical acceleration), angular velocity (yaw rate, roll rate, pitch rate), vehicle inclination, and the like. The vehicle state sensor 35 includes, for example, a vehicle speed sensor, an acceleration sensor, an angular velocity sensor, and an inclination sensor.

Further, the sensor group 30 may include a load meter 36. The load meter 36 is provided below the floor board 20. The load meter 36 measures a load distribution on the floor board 20.

The communication device 50 communicates with the outside of the vehicle 1. For example, the communication device 50 performs communication using a wireless communication network such as 4G or 5G. The communication device 50 may be connected to a wireless LAN. The communication device 50 may perform vehicle-to-vehicle communication or road-to-vehicle communication. The communication device 50 may perform direct communication (short-range wireless communication) with a user terminal of the passenger P. The short-range wireless communication is realized by, for example, Bluetooth (registered trademark), SmartDeviceLink (registered trademark), or the like.

The travel device 60 accelerates, decelerates, and turns the vehicle 1. The travel device 60 includes the above-described plurality of motors 13 and a motor controller (not shown) for driving the plurality of motors 13. The travel device 60 may include a brake mechanism that performs braking and a steering mechanism that steers the plurality of wheels 11.

The control device 110 is a computer that controls the vehicle 1. The control device 110 includes at least one processor 111 and at least one memory 112. The processor 111 performs various types of information processing. For example, the processor 111 includes a central processing unit (CPU). The memory 112 stores various types of information necessary for processing by the processor 111. The memory 112 is, for example, a volatile memory, a nonvolatile memory, a hard disk drive (HDD), a solid state drive (SSD), or the like. Various types of information processing by the processor 111 are realized by the processor 111 executing the control program PROG. The control program PROG is stored in the memory 112. The control program PROG may be recorded in a computer-readable recording medium.

The control device 110 (processor 111) receives various types of information acquired by the sensor group 30 and stores the received information in the memory 112. The control device 110 (processor 111) provides information to the passenger P or receives information from the passenger P via the HMI unit 40. The control device 110 communicates with the outside via the communication device 50.

Further, the control device 110 (processor 111) performs vehicle travel control (acceleration control, deceleration control, turning control) by controlling the travel device 60. For example, the control device 110 controls acceleration and deceleration of the vehicle 1 by controlling the plurality of motors 13. Further, the control device 110 controls the turning of the vehicle 1 by controlling the difference between the rotational speeds of the left and right motors 13.

The control device 110 (processor 111) may perform vehicle travel control such that the vehicle 1 travels autonomously.

As an example, a case where the vehicle 1 moves to a destination is considered. For example, the destination is a stop on a predetermined travel route. As another example, the destination may be a position at which the passenger P desires to get on or off. In this case, the passenger P can register the destination by using the user terminal of the passenger P. Specifically, the passenger P inputs a destination to the user terminal. The user terminal sends the input destination information to a management server, and the management server sends the destination information to the vehicle control system 100. Alternatively, the user terminal may perform short-range wireless communication with the vehicle control system 100 (the communication device 50) and directly provide the vehicle control system 100 with the information on the destination. As another example, the passenger P may directly input the destination using the HMI unit 40.

The memory 112 of the control device 110 stores map information. The control device 110 may communicate with the management server via the communication device 50 and acquire necessary map information from the management server. The current position of the vehicle 1 is obtained by the position sensor 34. The control device 110 determines a travel route from the current position to the destination.

Furthermore, the control device 110 generates a target trajectory for heading to the destination along the travel route. The target trajectory includes a target position and a target velocity. At this time, the control device 110 generates the target trajectory so as to avoid a collision with an object around the vehicle 1. An object around the vehicle 1 is recognized by a recognition sensor such as the outer camera 31 or the LIDAR 32. Then, the control device 110 performs vehicle travel control so that the vehicle 1 follows the target trajectory. Thus, autonomous traveling of the vehicle 1 is realized.

2. Passenger Guidance Control 2-1. Overview

When the distribution of passengers on the floor board 20 is uneven, the stability of the vehicle 1 may decrease. The decrease in the stability of the vehicle 1 causes the passenger P to feel uneasy.

Therefore, the vehicle control system 100 according to the present embodiment guides the passenger P as necessary in order to suppress a decrease in the stability of the vehicle 1. More specifically, the vehicle control system 100 detects a "passenger distribution" that is a distribution of the passengers P on the floor board 20. On the other hand, the "target passenger distribution" is a passenger distribution that increases the stability of the vehicle 1. The vehicle control system 100 guides the passengers P on the floor board 20 so that the passenger distribution approaches a target passenger distribution. Such control is hereinafter referred to as "passenger guidance control".

Figure 5:
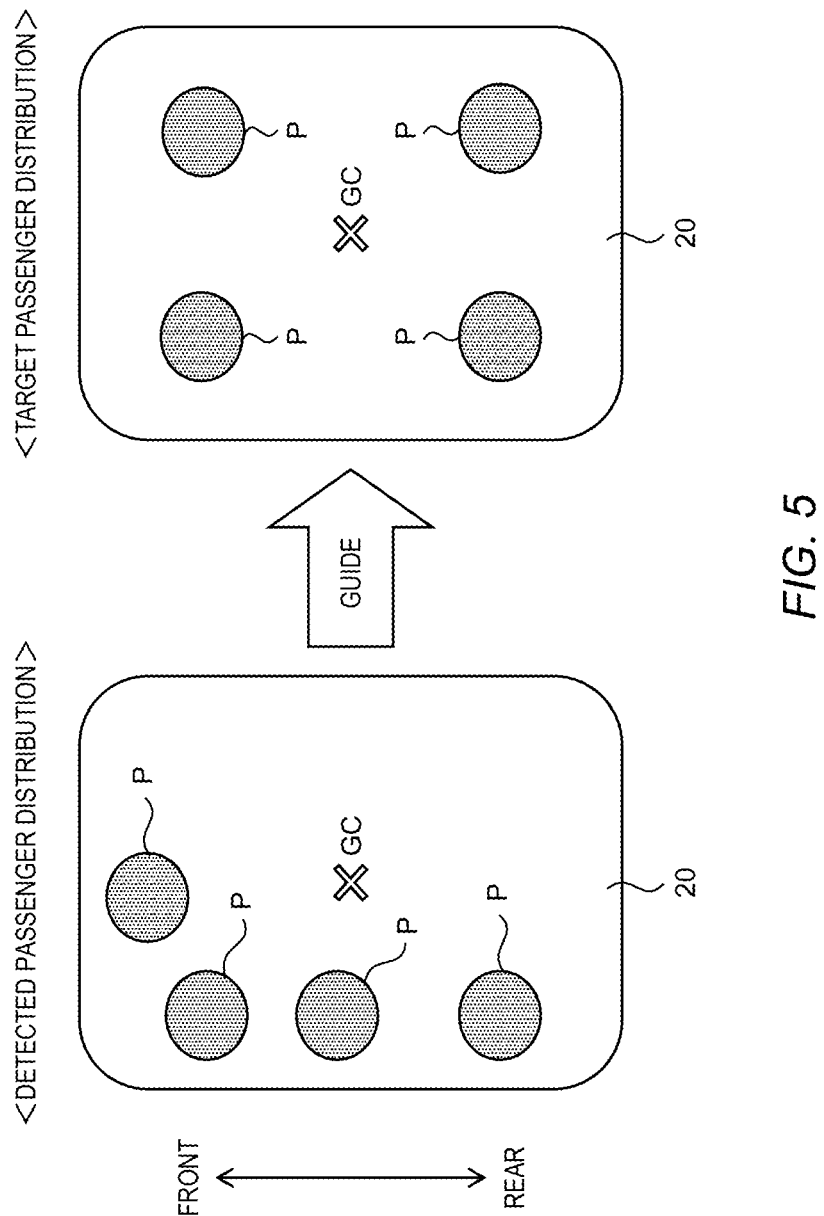
FIG. 5 is a conceptual diagram for explaining an example of a passenger guidance control according to the embodiment of the present disclosure.

FIG. 5 is a conceptual diagram for explaining an example of passenger guidance control. A plurality of passengers P are on the floor board 20. The position of the passenger P on the floor board 20, that is, the passenger distribution is biased to the left side when viewed from the position of the center of gravity GC of the vehicle 1. In other words, the center position of the entire passenger P is deviated to the left side when viewed from the position of the center of gravity GC of the vehicle 1. On the other hand, from the viewpoint of the stability of the vehicle 1, the plurality of passengers P are evenly distributed on the floor board 20 to increase stability of the vehicle 1. For example, in order to increase the stability of the vehicle the plurality of passengers P may be positioned symmetrically with respect to the center of gravity GC of the vehicle 1. The center position of the entire passenger P may coincide with the position of the center of gravity GC of the vehicle 1. The vehicle control system 100 performs passenger guidance control such that the passenger distribution approaches the target passenger distribution.

Figure 6:
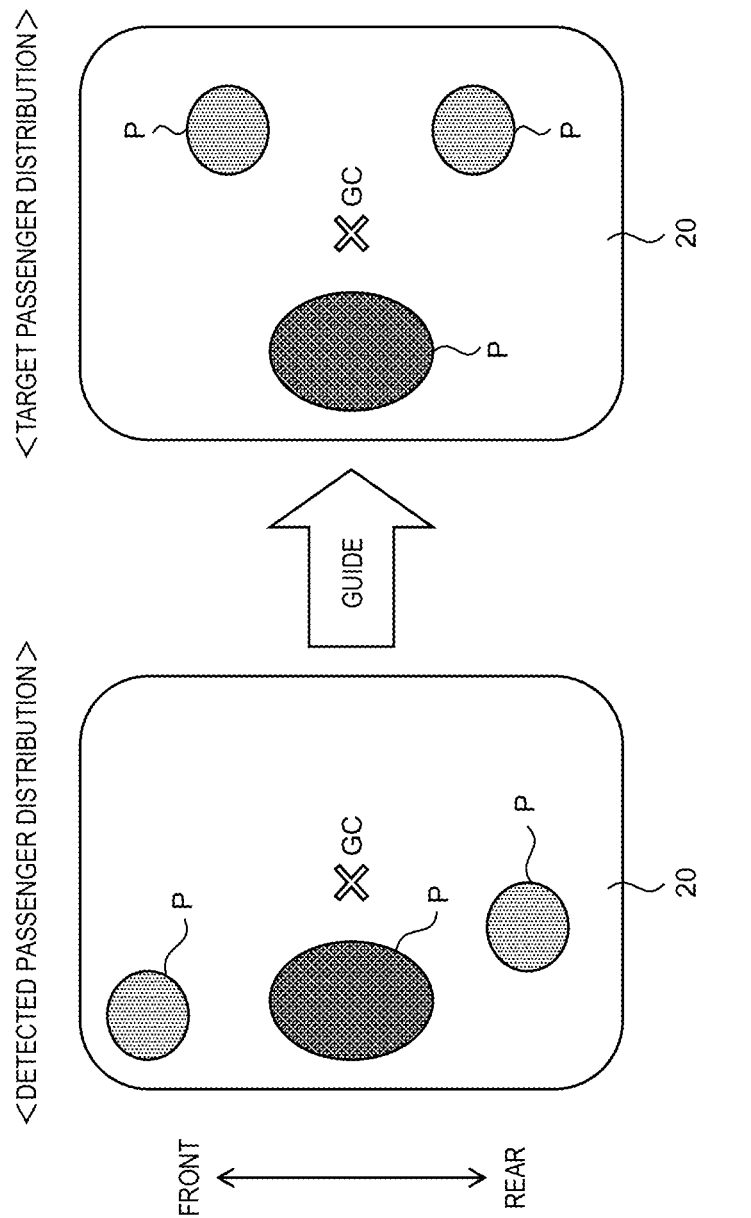
FIG. 6 is a conceptual diagram for explaining another example of the passenger guidance control according to the embodiment of the present disclosure.

FIG. 6 is a conceptual diagram for explaining another example of passenger guidance control. In the example shown in FIG. 6, information on the weight of each passenger P is also obtained. That is, the passenger distribution on the floor board 20 includes not only the passenger position on the floor board 20 but also the load distribution on the floor board 20. When the weight of each passenger P is also known, the target passenger distribution (passenger position and load distribution) may also be determined in consideration of the weight of each passenger P. For example, the load may be balanced as much as possible across the center of gravity GC of the vehicle 1. The position of the center of gravity of the all of the passengers P may coincide with the position of the center of gravity GC of the vehicle 1. The vehicle control system 100 performs passenger guidance control such that the passenger distribution approaches the target passenger distribution.

The passenger guidance control described above makes it possible to suppress a decrease in the stability of the vehicle 1. As a result, the uneasiness of the passenger P is suppressed. The passenger P can enjoy using the vehicle 1 at ease.

In addition, the passenger guidance control prevents the passengers P from gathering in one place. That is, the congestion of the passengers P is eliminated. Therefore, the passenger guidance control is also effective in securing the social distance.

Hereinafter, the passenger guidance control according to the present embodiment will be described in more detail.

2-2. Configuration Example

Figure 7:
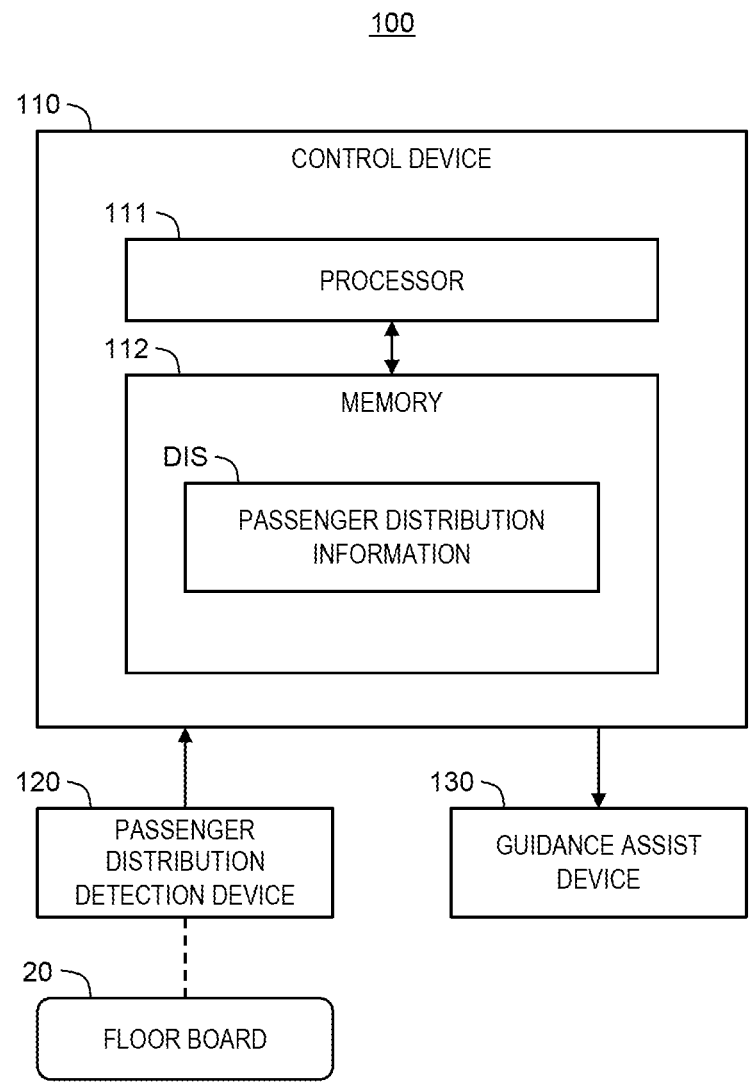
FIG. 7 is a block diagram schematically showing an example configuration of a vehicle control system related to a passenger guidance control according to an embodiment of the present disclosure.

FIG. 7 is a block diagram schematically showing a configuration of a vehicle control system 100 related to passenger guidance control according to the present embodiment. The vehicle control system 100 includes a control device 110, a passenger distribution detection device 120, and a guidance assist device 130.

The passenger distribution detection device 120 detects a passenger distribution which is a distribution of the passengers P on the floor board 20. The passenger distribution includes at least a passenger position that is a position of the passenger P on the floor board 20. From the passenger position, the number of passengers P on the floor board 20 is also known. The passenger distribution may include a load distribution on the floor board 20. From the load distribution, the position and weight of each passenger P are known. That is, the passenger distribution may include the position and weight of each passenger P.

Figure 8:
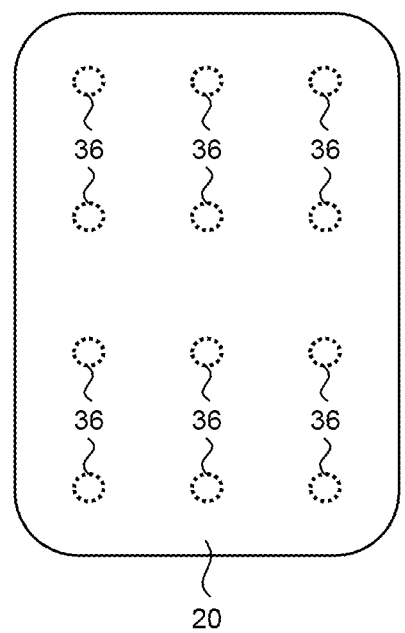
FIG. 8 is a conceptual diagram of a passenger distribution detection device according to the embodiment of the present disclosure.

FIG. 8 is a conceptual diagram for explaining an example of the passenger distribution detection device 120. The passenger distribution detection device 120 includes a plurality of load meters 36 provided below the floor board 20. Typically, the plurality of load meters 36 are arranged in a planar manner below the floor board 20. In some embodiments, the plurality of load meters 36 are uniformly arranged. The plurality of load meters 36 may be arranged in an array. The passenger position on the floor board 20 and the load distribution (weight of each passenger P) are obtained as the passenger distribution by the plurality of load meters 36.

As another example, the passenger distribution detection device 120 may include the inner camera 33 (see FIG. 1). The inner camera 33 captures an image of above the floor board 20. The control device 110 (processor 111) can calculate the position of the passenger P on the floor board 20 based on the imaging result of the riding space above the floor board 20. Specifically, it is possible to recognize the passenger P and calculate the position of the recognized passenger P by analyzing the image of the riding space captured by the inner camera 33.

The passenger distribution detection device 120 includes at least one of the plurality of load meters 36 and the inner camera 33. Thus, at least passenger positions on the floor board 20 are obtained as a passenger distribution. When the passenger distribution detection device 120 includes a plurality of load meters 36, the passenger position and the load distribution on the floor board 20 are obtained as the passenger distribution.

The passenger distribution information DIS indicates the passenger distribution detected by the passenger distribution detection device 120. The control device 110 acquires the passenger distribution information DIS and stores the acquired passenger distribution information DIS in the memory 112. Then, the control device 110 (processor 111) executes the passenger guidance control based on the passenger distribution information DIS.

In the passenger guidance control, the control device 110 (the processor 111) determines a target passenger distribution (a target passenger position) based on the passenger distribution detected by the passenger distribution detection device 120. The target passenger distribution is a passenger distribution that is configured to increase the stability of the vehicle 1. The target passenger location is a passenger location corresponding to the target passenger distribution.

More specifically, the passenger distribution detected by the passenger distribution detection device 120 includes at least passenger positions. From the passenger position, the number of passengers P on the floor board 20 is also known. From at least the number of passengers P, the target passenger distribution (target passenger position) can be determined. For example, as previously shown in FIG. 5, the target passenger locations are evenly distributed on the floor board 20. The target passenger position may be located symmetrically with respect to the center of gravity GC of the vehicle 1. The center position of the entire target passenger position may coincide with the position of the center of gravity GC of the vehicle 1.

When the passenger distribution also includes the load distribution (weight of each passenger P), the control device 110 can determine the target passenger distribution (target passenger position) in consideration of the weight of each passenger P. For example, as shown in FIG. 6, the target passenger distribution (target passenger position) is determined such that the position of the center of gravity of the entire passenger P and the position of the center of gravity GC of the vehicle 1 coincide with each other.

When the passenger distribution detection device 120 includes the inner camera 33, the following processing is also possible. That is, the control device 110 estimates the height of each of the passengers P on the floor board 20 based on the imaging result by the inner camera 33. Specifically, the height of each passenger P can be calculated by analyzing the image of the riding space captured by the inner camera 33. Similarly, the gender of each passenger P may be estimated. The control device 110 further estimates the height of the center of gravity of each passenger P based on the height and weight (and gender, if known) of each passenger P. Then, the control device 110 determines a target passenger distribution (a target passenger position) based on the weight and the height of the center of gravity of each passenger P. For example, the target passenger distribution (target passenger position) is determined such that the position of the center of gravity of the entire passenger P and the position of the center of gravity GC of the vehicle 1 overlap each other in the vertical direction. By also taking into account the height of the center of gravity of each passenger P, the position of the center of gravity of the entire passenger P can be calculated more accurately.

Alternatively, the passenger information including at least one of the height, the weight, and the gender of the passenger P may be provided from the passenger P. The passenger P inputs passenger information to his/her user terminal. The user terminal sends the passenger information to the management server. The management server manages the passenger information and provides the passenger information to the vehicle control system 100 as necessary. Alternatively, the user terminal may perform short-range wireless communication with the vehicle control system 100 (the communication device 50) and directly provide the passenger information to the vehicle control system 100. As another example, the passenger P may directly input the passenger information using the HMI unit 40. The control device 110 determines a target passenger distribution (a target passenger position) based on the passenger distribution detected by the passenger distribution detection device 120 and the passenger information provided by the passenger P.

Once the target passenger distribution is determined, the control device 110 (processor 111) performs passenger guidance control based on the target passenger distribution. More specifically, the control device 110 guides the passenger P on the floor board 20 to the target passenger position so that the passenger distribution approaches the target passenger distribution. In order to guide the passenger P to the target passenger position, the guidance assist device 130 is used. Various examples of the guidance assist device 130 are conceivable. Hereinafter, various examples of passenger guidance control using the guidance assist device 130 will be described.

2-3. Example of Passenger Guidance Control Using Guidance Assist Device

2-3-1. First Example

Figure 9:
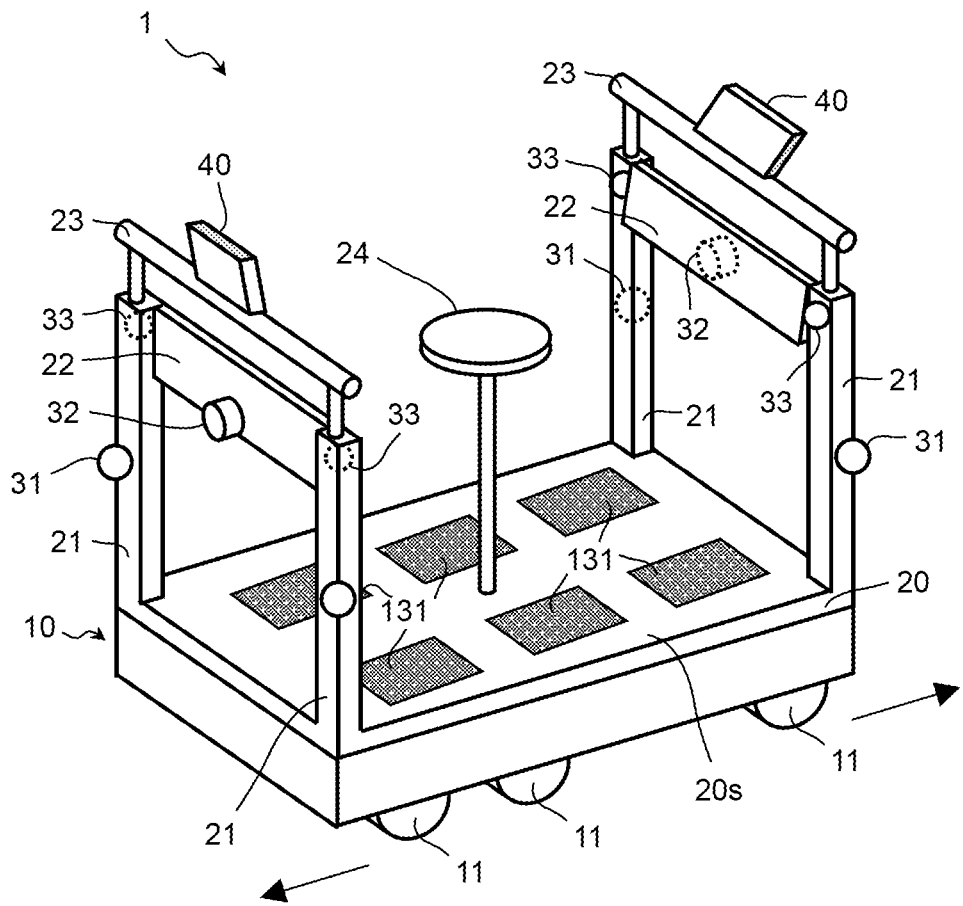
FIG. 9 is a perspective view for explaining a first example of a guidance assist device according to the embodiment of the present disclosure.
Figure 10:
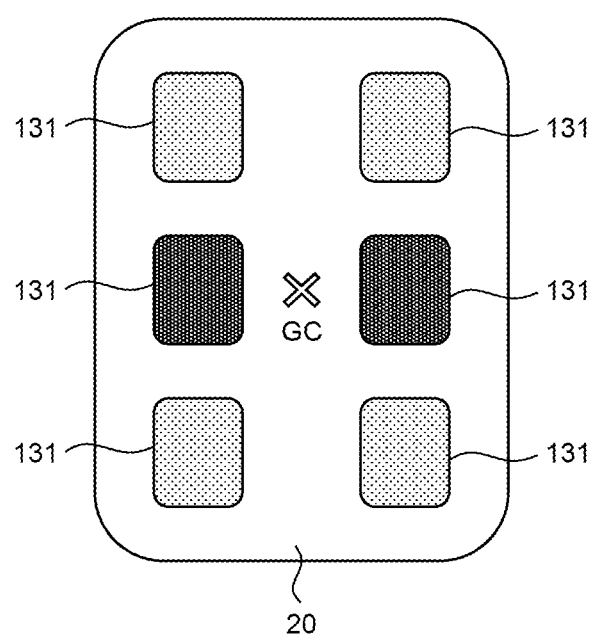
FIG. 10 is a plan view for explaining the first example of the guidance assist device according to the embodiment of the present disclosure.

FIGS. 9 and 10 are a perspective view and a plan view, respectively, for explaining a first example of the guidance assist device 130. In the first example, the guidance assist device 130 is a light emitting device 131 provided on a floor surface 20s (upper surface of the floor board 20). The control device 110 controls the light emitting device 131 so that the target passenger position is illuminated. Thus, the passenger P on the floor board 20 is guided to the target passenger position.

In the example shown in FIGS. 9 and 10, the light emitting device 131 includes a plurality of light emitting panels arranged on floor surface 20s. Examples of the light emitting panel include a light emitting diode (LED) panel, a liquid crystal panel, and an organic EL panel. The light emitting panel existing at the target passenger position among the plurality of light emitting panels is illuminated. The shape of each light emitting panel is arbitrary. The light emitting panel may have a foot shape. When the foot-shaped light emitting panel is turned on, the passenger P is more easily guided to the target passenger position.

The entire floor surface 20s may be a large light emitting panel. In this case, a portion of the large light emitting panel corresponding to the target passenger position is illuminated. The current load distribution may be displayed on the large light emitting panel. In this case, for example, a portion where the load is biased is displayed in red.

Figure 11:
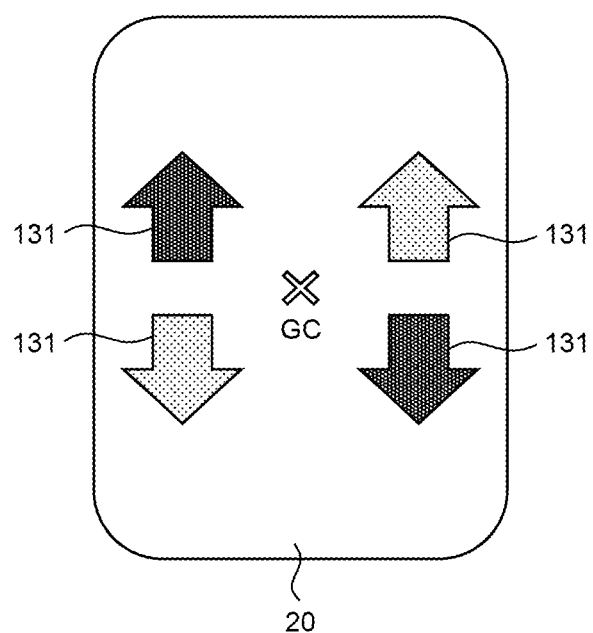
FIG. 11 is a plan view for explaining the first example of the guidance assist device according to the embodiment of the present disclosure.

FIG. 11 shows a modification of the first example. The control device 110 may control the light emitting device 131 such that a guide mark for prompting the passenger P to move to the target passenger position is illuminated. For example, the guide mark is an arrow indicating the moving direction of the passenger P. The light emitting device 131 may be a large-sized light emitting panel provided on the entire floor surface 20s. The control device 110 may control the light emitting device 131 so that both the target passenger position and the guide mark are illuminated.

2-3-2. Second Example

Figure 12:
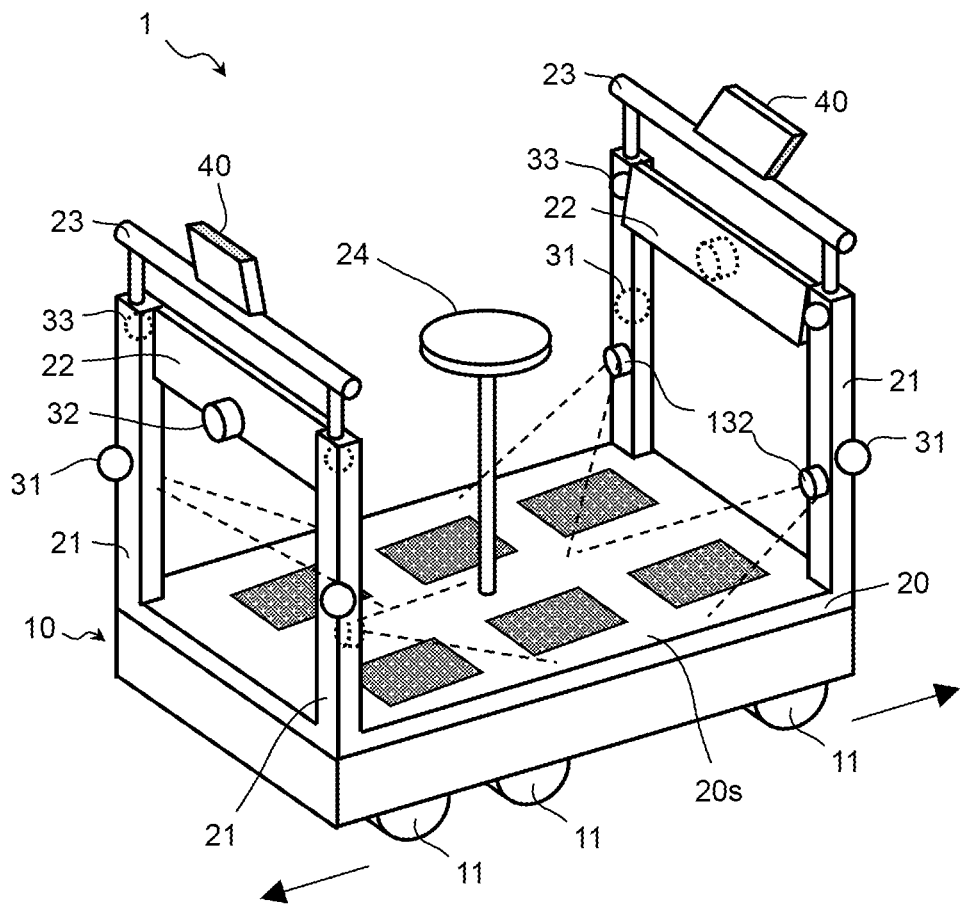
FIG. 12 is a perspective view for explaining a second example of the guidance assist device according to the embodiment of the present disclosure.

FIG. 12 is a perspective view illustrating a second example of the guidance assist device 130. In the second example, the guidance assist device 130 is at least one projector 132 that projects an image on the floor surface 20s. For example, at least one projector 132 is attached to at least one of the supports 21. Alternatively, the projector 132 may be attached to a lower surface of the table 24.

By projection mapping using the projector 132, the same information as in the first example can be displayed on the floor surface 20s. For example, the control device 110 controls the projector 132 to project an image indicating the target passenger position on the floor surface 20s. As another example, the control device 110 controls the projector 132 to project, on the floor surface 20s, an image prompting the passenger P to move to the target passenger position. Thus, the passenger P on the floor board 20 is guided to the target passenger position.

2-3-3. Third Example

Figure 13:
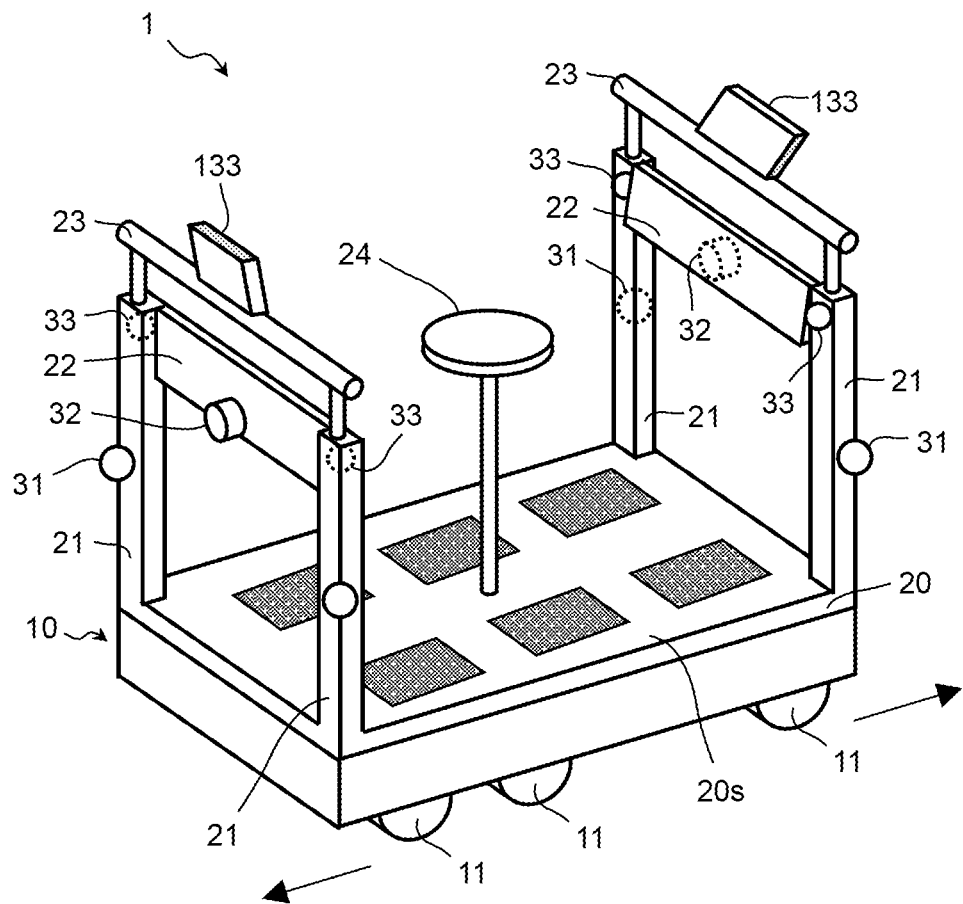
FIG. 13 is a perspective view for explaining a third example of the guidance assist device according to the embodiment of the present disclosure.

FIG. 13 is a perspective view illustrating a third example of the guidance assist device 130. In a third example, the guidance assist device 130 is a monitor 133 that displays information. The monitor 133 is installed at a position visible to the passenger P. For example, the monitor 133 is attached to the handrail 23. Alternatively, the monitor 133 may be attached to the upper surface of the table 24. The monitor 133 may be included in the HMI unit 40.

The control device 110 displays information indicating the target passenger location on the monitor 133. Thus, the passenger P on the floor board 20 is guided to the target passenger position. The control device 110 may display information indicating the current load distribution on the monitor 133. In this case, for example, a portion where the load is biased is displayed in red. The control device 110 may display a message on the monitor 133 prompting the passenger P to move to the target passenger location.

2-3-4. Fourth Example

Figure 14:
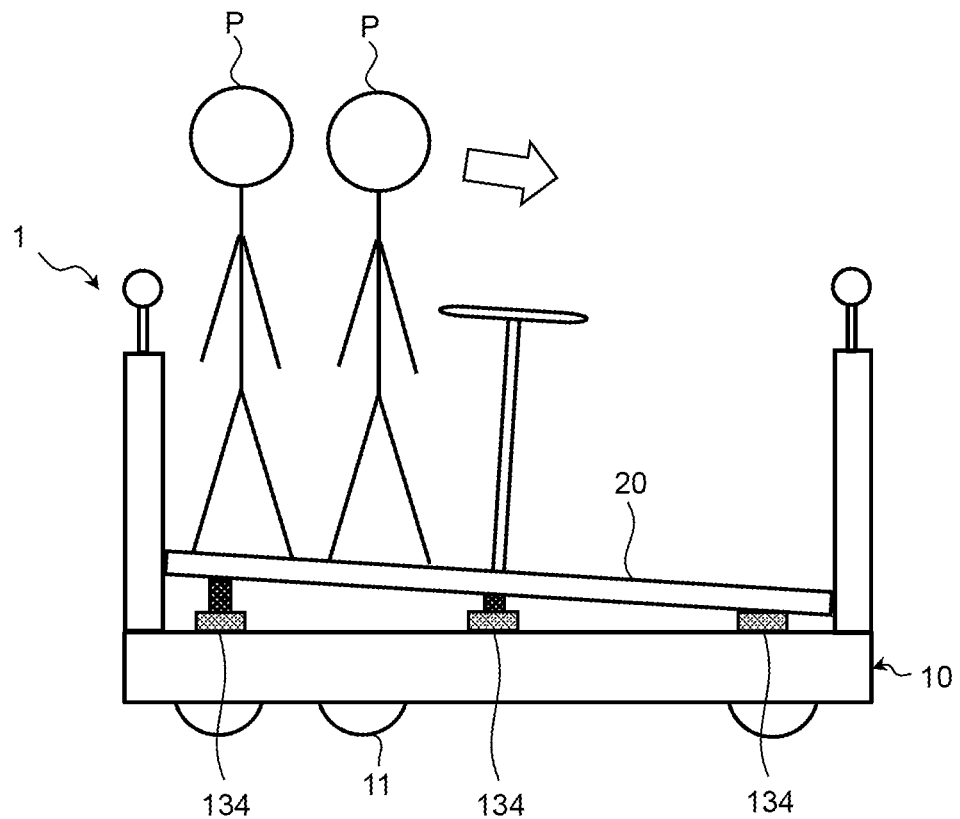
FIG. 14 is a side view for explaining a fourth example of the guidance assist device according to the embodiment of the present disclosure.
Figure 15:
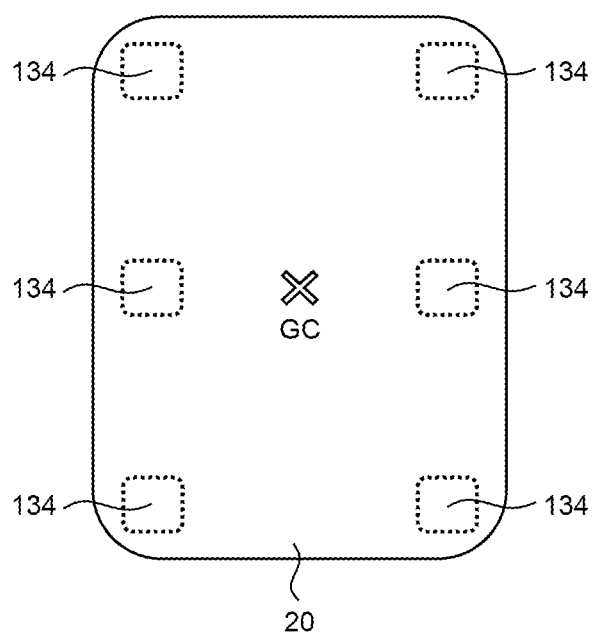
FIG. 15 is a plan view for explaining the fourth example of the guidance assist device according to the embodiment of the present disclosure.

FIGS. 14 and 15 are a side view and a plan view, respectively, for explaining a fourth example of the guidance assist device 130. In the fourth example, the guidance assist device 130 is at least one actuator 134 that changes the inclination of the floor board 20. The control device 110 controls the actuator 134 to change the inclination of the floor board 20, thereby guiding the passenger P in a direction toward the target passenger position.

In the example shown in FIGS. 14 and 15, a plurality of actuators 134 are disposed below the floor board 20. Each actuator 134 moves the floor board 20 in the vertical direction. Examples of the actuator 134 include an electric jack and a linear actuator. For example, the plurality of actuators 134 are disposed at least on the left front side, the right front side, the left rear side, and the right rear side of the floor board 20. By actuating some of the plurality of actuators 134, the floor board 20 can be tilted in a target direction.

When the floor board 20 is inclined, the passenger P on the floor board 20 easily moves in a descending direction of the inclined floor board 20. That is, the passenger P can be guided by inclining the floor board 20. As shown in FIG. 14, the passenger distribution on the floor board 20 is biased forward. Therefore, in order to guide a part of the passengers P rearward, the floor board 20 is inclined such that the front side is higher than the rear side and the rear side is lower than the front side. In general, the control device 110 changes the inclination of the floor board 20 so that the downward direction of the floor board 20 coincides with the direction in which the passenger P moves toward the target passenger position. Thus, the passenger P is guided to the target passenger position.

2-3-5. Fifth Example

In some embodiments, the guidance assist device 130 may be a combination of some of the above-described first to fourth examples.

2-4. Process Flow

Figure 16:
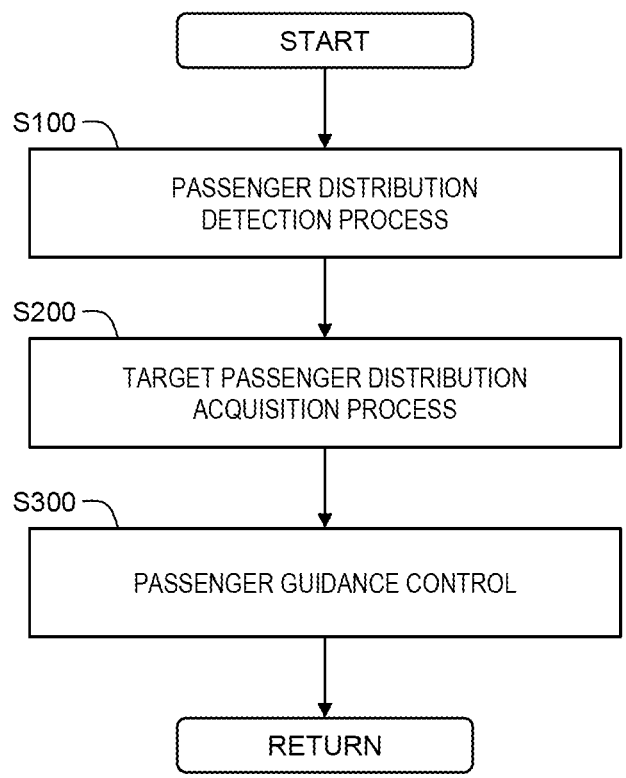
FIG. 16 is a flowchart schematically showing a process related to a passenger guidance control according to the embodiment of the present disclosure.

FIG. 16 is a flowchart schematically showing processing related to the passenger guidance control according to the present embodiment.

In Step S100, the passenger distribution detection device 120 executes a passenger distribution detection process for detecting the passenger distribution on the floor board 20. The passenger distribution includes at least the positions of the passengers P on the floor board 20. The passenger distribution may further include a load distribution (weight of each passenger P) on the floor board 20. The passenger distribution may further include the height of the center of gravity of each passenger P.

In Step S200, the control device 110 executes a target passenger distribution acquisition process. Specifically, the control device 110 determines a target passenger distribution (target passenger position) based on the passenger distribution detected by the passenger distribution detection device 120. The target passenger distribution is a passenger distribution that increases the stability of the vehicle 1. The target passenger location is a passenger location corresponding to a target passenger distribution.

In Step S300, the control device 110 executes the passenger guidance control that guides the passenger P on the floor board 20 to the target passenger position so that the passenger distribution approaches the target passenger distribution. Specifically, the control device 110 performs the passenger guidance control using the guidance assist device 130 (see FIGS. 9 to 15).

2-5. Consideration of Vehicle Inclination

Figure 17:
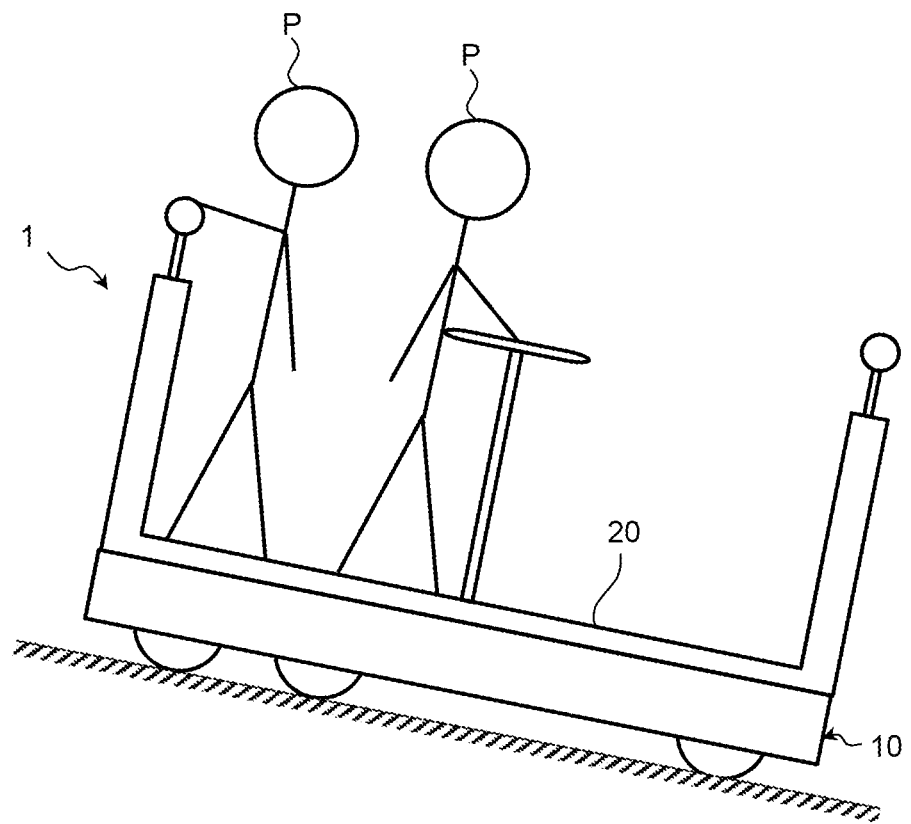
FIG. 17 is a side view showing an example of traveling of the vehicle according to the embodiment of the present disclosure.

As shown in FIG. 17, the vehicle 1 travels on a slope. When the vehicle 1 travels on a slope, the vehicle 1 inclines from a horizontal plane. The target passenger distribution in this case does not necessarily coincide with the target passenger distribution when the vehicle 1 is on the horizontal plane. For example, as shown in FIG. 17, when the vehicle 1 travels on an uphill road, the position of the center of gravity of all of the passengers P may be located frontward of the position of the center of gravity GC of the vehicle 1 to increase stability of the vehicle 1. That is, the position of the center of gravity of all of the target passenger positions may be located forward of the position of the center of gravity GC of the vehicle 1 to increase stability of the vehicle 1. Similarly, when the vehicle 1 travels on a downward slope, the position of the center of gravity of all of the passengers P may be located rearward of the position of the center of gravity GC of the vehicle 1 to increase stability of the vehicle 1. That is, the position of the center of gravity of all of the target passenger positions may be located behind the position of the center of gravity GC of the vehicle 1 to increase stability of the vehicle 1. In general, when the vehicle 1 passes through a slope, the position of the center of gravity of all of the target passenger positions is located above the position of the center of gravity GC of the vehicle 1 to increase stability of the vehicle 1.

Therefore, when the vehicle 1 passes through a slope, the control device 110 corrects the target passenger distribution in consideration of the inclination of the vehicle 1 and executes the passenger guidance control. The inclination of the vehicle 1 is detected by, for example, an inclination sensor included in the vehicle state sensor 35. The control device 110 corrects the target passenger distribution from the viewpoint of the stability of the vehicle 1 according to the inclination of the vehicle 1 in order to increase a stability of the vehicle 1. For example, the control device 110 corrects the target passenger distribution such that the position of the center of gravity of all of the target passenger positions is located above the position of the center of gravity GC of the vehicle 1. The same applies to a case where the vehicle 1 passes through a step or a cant road (bank road).

The control device 110 may recognize the timing at which the vehicle 1 passes through a slope, a step, or a cant road. For example, when a slope or the like is registered in the map information, the control device 110 can recognize the timing at which the vehicle 1 passes through the slope or the like based on the position information of the vehicle 1 and the map information. The step may be detected by a recognition sensor such as the outer camera 31 or the LIDAR 32. The passage through the step may be detected by a vertical acceleration sensor included in the vehicle state sensor 35. At a timing when the vehicle 1 passes through a slope, a step, or a cant road, the control device 110 corrects a target passenger distribution in consideration of the inclination of the vehicle 1.

In this way, by correcting the target passenger distribution in consideration of the inclination of the vehicle 1, a decrease in the stability of the vehicle 1 on a slope, a step, or a cant road is suppressed. The vehicle 1 can more stably pass through a slope, a step, or a cant road. As a result, the uneasiness of the passenger P is suppressed.

3. Travel Limit Control 3-1. Overview

The vehicle control system 100 according to the present embodiment may limit travel of the vehicle 1 as necessary in order to suppress a decrease in stability of the vehicle 1. The control for limiting the travel of the vehicle 1 is hereinafter referred to as "travel limit control". The travel limit control is independent of the above-described passenger guidance control.

Figure 18:
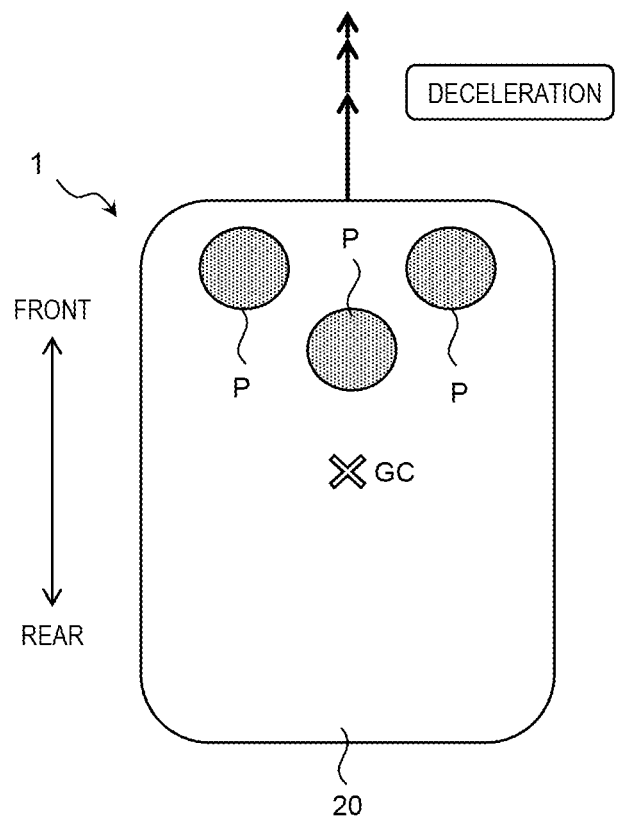
FIG. 18 is a conceptual diagram for explaining an example of a travel limit control according to the embodiment of the present disclosure.

FIG. 18 is a conceptual diagram for explaining an example of a travel limit control. In the situation shown in FIG. 18, the passenger distribution on the floor board 20 is biased towards the front. Therefore, the vehicle 1 tends to lean forward. When the vehicle 1 suddenly decelerates in this situation, the vehicle 1 leans further forward, and the stability of the vehicle 1 decreases. Therefore, in order to suppress a further increase in the inclination of the vehicle 1, the vehicle control system 100 limits the deceleration. For example, the vehicle control system 100 sets an upper limit value of the deceleration and limits the deceleration to the upper limit value or less.

Figure 19:
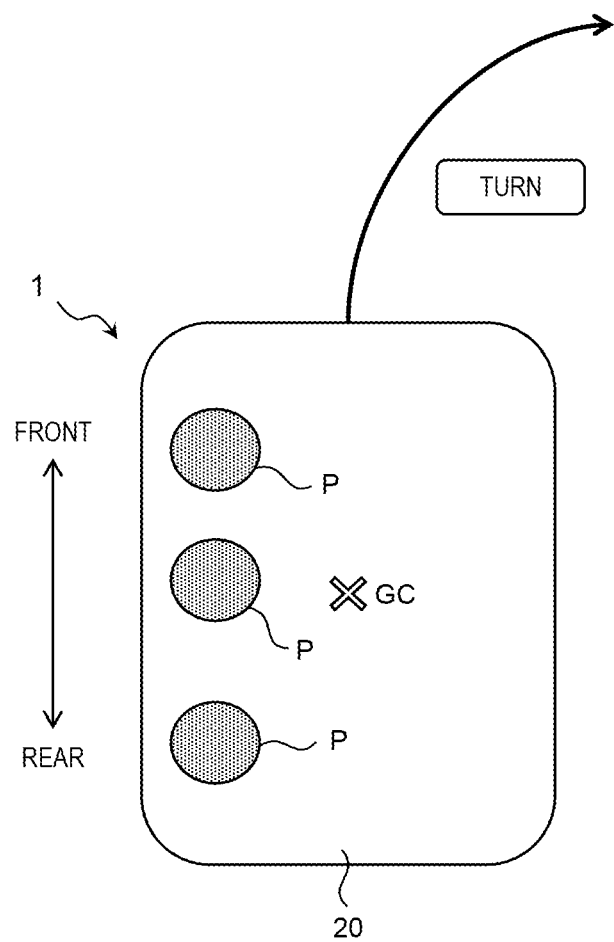
FIG. 19 is a conceptual diagram for explaining another example of the travel limit control according to the embodiment of the present disclosure.

FIG. 19 is a conceptual diagram for explaining another example of the travel limit control. In the situation shown in FIG. 19, the passenger distribution on the floor board 20 is biased to the left. Therefore, the vehicle 1 tends to lean to the left. In this situation, when the vehicle 1 makes a sharp turn to the right, the vehicle 1 leans further to the left, and the stability of the vehicle 1 decreases. Therefore, in order to suppress a further increase in the inclination of the vehicle 1, the vehicle control system 100 limits the speed, the lateral acceleration, or the yaw rate during the right turn. For example, the vehicle control system 100 sets an upper limit value, and limits the speed, the lateral acceleration, or the yaw rate during the right turn to be equal to or less than the upper limit value.

The travel limit control is generalized as follows. That is, the vehicle control system 100 limits at least one of the speed, the longitudinal acceleration, the lateral acceleration, and the yaw rate of the vehicle 1 so as to suppress an increase in the inclination of the vehicle 1. Accordingly, a decrease in the stability of the vehicle 1 is suppressed. As a result, the uneasiness of the passenger P is suppressed.

The travel limit control can also be applied when the vehicle 1 travels on a slope or a cant road (bank road). That is, when the vehicle 1 travels on a slope or a cant road, the vehicle control system 100 limits at least one of the speed, the longitudinal acceleration, the lateral acceleration, and the yaw rate of the vehicle 1 so as to suppress a further increase in the inclination of the vehicle 1. As a result, in the stability of the vehicle 1 on a slope or a cant road is suppressed. The vehicle 1 can pass through a slope or a cant road more stably. As a result, the uneasiness of the passenger P is suppressed.

3-2. Configuration Example

Figure 20:
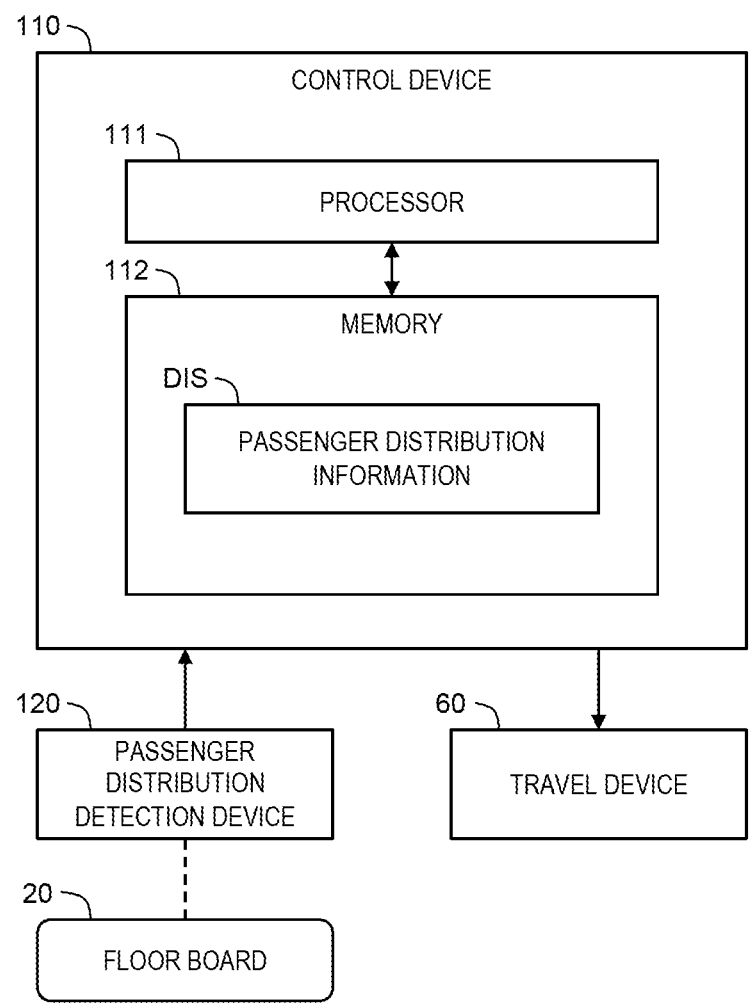
FIG. 20 is a block diagram schematically showing a configuration of a vehicle control system related to travel limit control according to the embodiment of the present disclosure.

FIG. 20 is a block diagram schematically showing a configuration of a vehicle control system 100 related to travel limit control according to the present embodiment. The vehicle control system 100 includes the control device 110, the passenger distribution detection device 120, and the travel device 60.

The passenger distribution detection device 120 is the same as that described in Section 2 above. That is, the passenger distribution detection device 120 detects the passenger distribution on the floor board 20. The passenger distribution includes at least passenger positions on the floor board 20. The passenger distribution may further include a load distribution (weight of each passenger P) on the floor board 20. The passenger distribution may further include the height of the center of gravity of each passenger P.

The control device 110 acquires passenger distribution information DIS and stores the acquired passenger distribution information DIS in the memory 112. The passenger distribution information DIS indicates the passenger distribution detected by the passenger distribution detection device 120. Then, the control device 110 (processor 111) executes the travel limit control based on the passenger distribution information DIS.

Specifically, the control device 110 can estimate the inclination direction of the vehicle 1 by referring to the passenger distribution. The control device 110 limits at least one of the speed, the longitudinal acceleration, the lateral acceleration, and the yaw rate of the vehicle 1 so as to suppress a further increase in the inclination of the vehicle 1. More specifically, the control device 110 executes vehicle travel control (acceleration control, deceleration control, turning control) by controlling the travel device 60. When performing the vehicle travel control, the control device 110 limits at least one of the speed, the longitudinal acceleration, the lateral acceleration, and the yaw rate of the vehicle 1 so as to suppress a further increase in the inclination of the vehicle 1.

For example, the control device 110 sets an upper limit value of at least one of the speed, the longitudinal acceleration, the lateral acceleration, and the yaw rate of the vehicle 1. Then, the control device 110 limits at least one of the speed, the longitudinal acceleration, the lateral acceleration, and the yaw rate to an upper limit value or less. When there is a default setting of the upper limit value, the control device 110 sets the upper limit value lower than the default value.

3-3. Modifications

Figure 21:
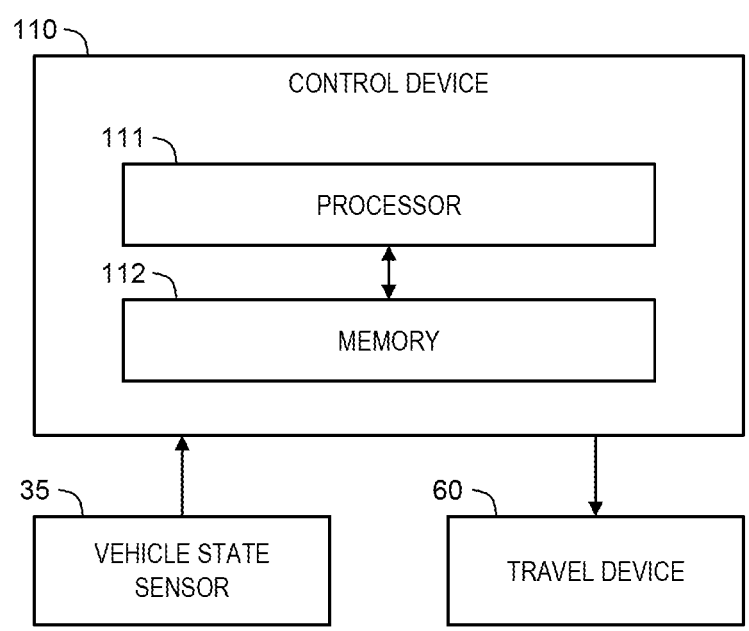
FIG. 21 is a block diagram showing a modification of the configuration of the vehicle control system related to the travel limit control according to the embodiment of the present disclosure.

FIG. 21 is a block diagram showing a modification of the configuration of the vehicle control system 100 related to the travel limit control. The inclination of the vehicle 1 is detected by the inclination sensor included in the vehicle state sensor 35. The control device 110 acquires information on the inclination of the vehicle 1 from the inclination sensor. Then, the control device 110 limits at least one of the speed, the longitudinal acceleration, the lateral acceleration, and the yaw rate of the vehicle 1 so as to suppress a further increase in the inclination of the vehicle 1.

4. Others

A combination of the "passenger guidance control" described in Section 2 and the "travel limit control" described in Section 3 is also possible.

What is claimed is:

1. A vehicle that transports passengers, the vehicle comprising:
   a floor board on which the passengers ride;
   a passenger distribution detection device configured to detect a current passenger distribution that is a distribution of the passengers on the floor board; and
   a control device configured to execute a passenger guidance control that determines a target passenger distribution to increase a stability of the vehicle based on the current passenger distribution detected by the passenger distribution detection device and guides the passengers on the floor board such that the current passenger distribution approaches the target passenger distribution.

2. The vehicle according to claim 1, further comprising a light emitting device provided on a surface of the floor board,
   wherein in the passenger guidance control, the control device controls the light emitting device so that a target passenger position corresponding to the target passenger distribution is illuminated, or controls the light emitting device so that a guide mark that prompts movement to the target passenger position is illuminated.

3. The vehicle according to claim 1, further comprising a projector that projects an image on a surface of the floor board,
wherein in the passenger guidance control, the control device controls the projector to project the image indicating a target passenger position corresponding to the target passenger distribution, or controls the projector to project the image that prompts movement to the target passenger position.

4. The vehicle according to claim 1, further comprising a monitor,
wherein in the passenger guidance control, the control device displays information indicating a target passenger position corresponding to the target passenger distribution on the monitor.

5. The vehicle according to claim 1, further comprising an actuator that changes an inclination of the floor board,
wherein in the passenger guidance control, the control device controls the actuator to change the inclination of the floor board to guide the passengers in a direction toward a target passenger position corresponding to the target passenger distribution.

6. The vehicle according to claim 1,
wherein the passenger distribution detection device includes a plurality of load meters provided below the floor board, and
the passenger distribution includes a weight of each of the passengers on the floor board.

7. The vehicle according to claim 6,
wherein the passenger distribution detection device further includes a camera that captures an image of a passenger space above the floor board, and
the control device estimates a height of each of the passengers based on the image captured by the camera, estimates a height of a center of gravity of each of the passengers based on the height and the weight of each of the passengers, and determines the target passenger distribution based on the weight and the height of the center of gravity of each of the passengers.

8. The vehicle according to claim 1,
wherein when the vehicle passes through a slope, a step, or a cant road, the control device executes the passenger guidance control by correcting the target passenger distribution based on an inclination of the vehicle.

9. A vehicle control system for controlling a vehicle including a floor board on which passengers ride, the vehicle control system comprising:
a passenger distribution detection device configured to detect a current passenger distribution that is a distribution of the passengers on the floor board; and
a control device configured to execute a passenger guidance control that determines a target passenger distribution to increase a stability of the vehicle based on the current passenger distribution detected by the passenger distribution detection device and guides the passengers on the floor board such that the current passenger distribution approaches the target passenger distribution.

\* \* \* \* \*